United States Patent Office 3,213,036
Patented Oct. 19, 1965

3,213,036
PHOSPHORUS CONTAINING POLYMERIZATION
CATALYST
Jacque C. Morrell, 8 Oxford St., Chevy Chase, Md.
No Drawing. Filed Sept. 20, 1963, Ser. No. 310,460
8 Claims. (Cl. 252—435)

The application is a continuation-in-part of prior copending applications Serial Number 780,272, filed December 15, 1958, now Patent Number 3,044,964, issued July 17, 1962; Serial Number 803,586, filed April 2, 1959, now Patent Number 3,132,109, issued May 5, 1964; Serial Number 799,857, filed March 17, 1959, now Patent Number 3,050,472, issued August 21, 1962; Serial Number 800,948, filed March 23, 1959, now Patent Number 3,050,-473, issued August 21, 1962; and Serial Number 791,543, filed February 6, 1959, now abandoned.

This invention relates to polymerization catalysts and more particularly to improvements in those types of polymerization catalysts which contain as their principal ingredients a phosphoric acid and a natural porous silica material. The latter material is generally referred to as kieselguhr or infusorial earth and sometimes as diatomaceous earth. In its most specific aspect my invention relates to improvements of the compression strength and hardness, and in general the wearing qualities of such polymerization catalysts which is at present a most important problem.

The catalysts produced from such mixtures of phosphoric acid and porous silica material, after baking and/or drying the same, have proven to be the best available catalysts for the polymerization of normally gaseous olefins to produce liquid hydrocarbon components of high octane motor and aviation fuels. The polymerization process has for a great many years been one of the most useful and important in the economy of petroleum refining for the conversion of otherwise practically waste gases resulting from both thermal and catalytic cracking into valuable components of motor fuels. The catalyst itself is highly active for the purpose, but its outstanding weakness has been its poor wearing qualities and its tendency to crumble and to dust during handling and use. This results in a relatively short life and frequent turnover of catalyst with the attendant increased costs. Despite the many years that this problem has existed and the many attempts to solve it, no satisfactory solution has been available to the industry and it is a prime object of the present invention to relieve the refining industry of the problem.

In my present application I have made further improvements wherein I employ a catalyst composition comprising a phosphate, either as such or produced in situ, the said phosphate being selected from the group consisting of aluminum, magnesium and calcium phosphates present in very minor proportions, in combination with a natural porous silica material of the class consisting of kieselguhr, infusorial earth and diatomaceous earth and incorporating the latter mixture with the maximum amount of a phosphoric acid, up to 80% and above, to achieve the desired balance of catalyst hardness and compression strength on the one hand and the polymerizing activity of the phosphoric acid on the other hand at relatively low cost. I may also employ an oxide preferably (or a hydrated oxide) of aluminum, magnesium, or calcium in admixture with the diatomaceous earth and phosphoric acid. These oxides react, at least in part, to form the phosphate especially during the hearing step of the process described below. Each of these additives namely the kaolin employed in my prior applications and the phosphates and/or oxides of aluminum, magnesium and calcium exerts its own individual characteristics both in the preparation of the catalyst and in its final properties and they are thus on a strictly non-equivalent basis. Moreover, I have discovered that both the form in which these individual materials are produced as well as the manner in which they are incorporated with the other materials may affect the quality of the final product. This further emphasizes the non-equivalency of the several additive materials employed by me.

In carrying out the objects of my invention I incorporate from about 5% to 30% (based on the mineral mix) preferably from about 5 to 10% of an oxide of aluminum, magnesium or calcium, or of a phosphorate, or a sulphate or silicate of calcium, directly as such or made in situ, with about 95% to 70% of kieselguhr, also referred to as infusorial earth or diatomaceous earth. Thus the preferred composition of the final product which for example contains 20% of the mineral mixture and 80% of phosphoric acid may contain from 1% to 2% of the additive based on the total on a basis of 5% to 10% of the mineral mix. Since 1% to 2% on the mineral mix may show beneficial results the content on the final product may be even lower, e.g., about ½%. At the other extreme of say 30% of the additive (on the mineral mix) and up to about 40% of the latter on the total, the latter would not exceed 10% to 12% on the final product even in unusual cases. The mineral mix, i.e., the kieselguhr and additive may be mixed directly, and are then admixed with from 60% to 85% (or more generally from 75% to 85%) of a phosphoric acid (calculated upon a basis of 100% phosphoric acid in the final mixture) and preferably in the range of 78% to 82% of the latter. This mixture may then be extruded and cut to proper size after which it is dried or baked by heating preferably in stages to from about 600° to 800° F. and higher for about 4 hours or longer.

With reference to the expression of phosphates "made in situ" I have in mind the reaction whereby the oxides of aluminum, magnesium or calcium may ultimately react with the phosphoric and to form the corresponding phosphate especially during the heating step. Making the phosphate in "situ" may be desirable as the phosphates are more costly than the oxides, and there appear to be other benefits in improved product, the explanation of which may not be as obvious as the observed results.

Mixing of either the oxide or the phosphate may be carried out by (a) incorporating them directly in the phosphoric acid, and thereafter mixing with the kieselguhr, etc., (b) mixing the oxide or phosphate with the kieselguhr, etc., and thereafter mixing in the phosphoric, and or (c) mixing the oxide or phosphate of aluminum, magnesium or calcium in the admixture of kieselguhr and phosphoric acid.

It is particularly to be noted that while it is possible to form the phosphate in situ by the use of other compounds of aluminum, magnesium or calcium than the oxide, as pointed out, I prefer the oxide (or the hydrated oxide, e.g., the mineral bauxite in the case of aluminum) as there are not objectionable impurities formed as a by-product.

I avoid the use of compounds of aluminum, magnesium and calcium in which objectionable gaseous products such as hydrogen chloride or carbon dioxide or oxides of nitrogen. Oxides of nitrogen and the like are formed (either alone or with kieselguhr) when they are mixed with the phosphoric acid and especially during the heating step. For example, formation of hydrogen chloride occurs when the chloride of aluminum, or of magnesium, or of calcium is employed in the mixture. The product which results from the use of the chloride is so foamy, bloated, weak and friable the direct opposite of the result to be achieved here of producing a stronger catalyst. The production of such gases occurs from the moment of mixing the phosphoric acid and the salt, that the main evolution of the acidic gases occurs when the product is heated to dry and bake. Aside from the very weak and bloated structure, the evolved gas produced excessive swelling to very many times the size of the original catalyst granule or pellet. The internal structure of the product made with a gas envolving salt consists of relatively large blow holes or pores non-uniform in character, with thin very friable walls.

One method, by which it is possible that such highly undesirable effects may be avoided is by direct incorporation of the chloride in the phosphoric acid, followed by prolonged heating of the solution, prior to admixture with the kieselguhr. However, the addition of gas forming salts and other extraneous materials such as organic binder substances are preferably avoided.

The use of carbonates of magnesium or calcium as an additive, while they are more satisfactory than the chlorides, being the carbon-dioxide evolved being much less obnoxious toxic than hydrogen chloride, also produces bloated and friable and greatly enlarged after the heating step. The carbonates may, however, be mixed directly with the phosphoric and heated prior to incorporating the kieselguhr.

In the special case of the calcium salts I have found that the relatively insoluble calcium sulphate (or gypsum) and calcium silicate give good results as shown in Table 3. I therefore contemplate employing these salts as well as the oxide and phosphate of calcium.

The terms kieselguhr, infusorial earth and diatomaceous earth (also tripolite) are used interchangeably for example in Hackh's Chemical Dictionary (1929), and all three terms are defined as a light earthy sedimentary rock consisting of the microscopic empty shells of diatoms. Infusorial earth, kieselguhr, diatomite, tripolite, diatomaceous earth-siliceous earth are similarly used interchangeably and are referred to as—a fine powder composed of siliceous skeletons of diatoms, sp. gr. 0.24–0.34, in Chemical and Technical Dictionary (1947) and similarly in Chemical and Engineering Dictionary (both by Chemical Publishing Co.). The terms are likewise used interchangeably in Webster New Collegiate Dictionary (1951) (based on Webster's New International Dictionary); Winston's Simplified Dictionary, College Edition, 1938; and Practical Standard Dictionary, Funk and Wagnall's (1929), also the Merck Index, 1952 edition, others. These materials are likewise sold and used interchangeably under these several terms; the major portion of all of them being up to as high as 90% $SiO_2$ in the form of porous siliceous skeletal substances. Large deposits of these materials occur in various locations, e.g. California, Nevada, Oregon, etc. As with all naturally occurring materials, the $SiO_2$ content and impurities show variations within the general class a well as within the individual deposits. The term kieselguhr, infusorial earth and diatomaceous earth and in general such naturally occurring porous siliceous materials will be used and referred to interchangeably and on an equivalent basis in connection with the present invention. Tests on various such products showed comparable results within the variations which might be expected i.e. the presence of other substances in varying amounts besides the porous siliceous materials in the several types. These with the higher amounts of porous silica are preferred.

The various well known phosphoric acids (ortho, pyro and meta) as well as those less well known phosphoric acids (such as tetra-phosphoric) all come within the scope of my invention. These phosphoric acids are related to each other in that they may be formed by successive dehydration steps and conversely they may be made from phosphorous pentoxide by successive additions of the proper amounts of water to $P_2O_5$. Also the latter may be added to various concentrations of phosphoric acid e.g. from 75% to 85% and higher and the resultant mixture may be assumed (as has been done in the prior art "to contain free phosphorous pentoxide") that is to say that the latter has been added to the former. Alternatively the mixture may contain "a definite percentage of pyrophosphoric acid corresponding to the primary phase of dehydration of the orthophosphoric acid" or corresponding to the primary and secondary phases of hydration of the pentoxide. Meta phosphoric acid is also formed by the dehydration of ortho and pyrophosphoric acids or by the hydration of phosphorous pentoxide. Pyrophosphoric acid itself may be used at a temperature above its melting point of 140° F. but this is less desirable than the mixture. Therefore from the overall practical viewpoint and for convenience I prefer to use the orthophosphoric acid starting for example with the 85% commercial concentration (or diluting the latter as found desirable e.g. from 75% to 85%) to which has been added various proportions of $P_2O_5$ (generally to a thick syrupy consistency); as found suitable or necessary simultaneously to incorporate the necessary amount of phosphoric acid in the mixture and to obtain a material of proper consistency prior to forming and baking. It is desirable to incorporate the maximum amounts possible of phosphoric acid which will produce a mixture which can be readily extruded and heated without flowing or undue deformation of the mixture during heating. Phosphorous pentoxide dissolves readily in orthophosphoric acid of commercial grade generally about 85% concentration particularly at elevated temperatures so that it is only a question of adjustment to obtain the desired concentration of the acid e.g. about 80% or more by varying the concentration and amount of these two components, but of course the other components must also be adjusted.

In order to ascertain readily the amount of phosphoric acid present in the mixture especially for comparison I determine the percentages on the basis of 100% orthophosphoric acid irrespective of the concentration present during mixing and of the form in which it may be present in the final product after heating.

The heavy stiff paste or mixture made by mixing the various materials including the additives i.e. the compounds of aluminum, magnesium and calcium referred to above; the porous silica material i.e. the kieselguhr and the phosphoric acid may be formed into pellets or preferably by extrusion into suitable shapes and cut into proper sizes generally ⅛ to ¼″ diameter and about ¼″ length or otherwise formed, or the dried and baked material may be sized later.

The consistency of the mixture before drying may vary somewhat depending on the temperature of mixing, the relative proportions of the components including the specific additive, the kieselguhr and the relative amount and concentration of phosphoric acid. It is desirable in all cases that the proportions of the materials be adjusted so that the mixture is stiff enough to be formed by extrusion and dried or baked without too much deformation. The application of a relatively small amount of heat at low temperatures e.g. about 150° F. to 200° F. after mixing assists in congealing and thickening the mixture if necessary to permit forming although this may generally be avoided by proper formulation; and even by adjustment of the components after mixing, by adding one or the other as required.

The formed catalyst may be dried and/or baked at temperatures varying from about 600° F. to about 800° F. and higher for about four hours and longer. Preferably the heating is done in two stages i.e. to about 200° F. to 250° F. for about one hour and then to about 600° F. to 800° F. or higher for about 4 hours or longer. For some special cases for example with high phosphoric acid contents of more than 80% I may employ temperatures progressively higher for example from 750° F. to 850° F. and higher e.g. up to and about 900° F. In some cases controlled rehydration of the baked catalyst is desirable.

My invention thus produces a greatly superior product, and more economically. It corrects vital deficiencies in respect to wearing qualities such as hardness and compression strength in the prior art catalysts while at the same time retaining the higher activity of the latter.

When used for polymerizing normally gaseous olefins, the granules or pellets or catalyst are generally placed in treating towers and the gases containing olefins are passed downwardly through the towers at temperatures of 400 to 500° F. and pressures of several hundred pounds, e.g. 100 to 350 lbs. per square inch when employing stabilizer refluxes which contain e.g. 10 to 35% of propene and butenes. With gas mixtures containing normal and iso-butene to obtain mixed polymerization the temperature may be lower, e.g. 250° to 350° F. with pressure of 500 to 800 lbs. per square inch, other reactions may be similarly carried out. It may also be desirable to introduce some steam during the reaction to maintain the normal vapor pressure of the catalyst; or the gas may be saturated with water vapor.

To remove carbonaceous or hydrocarbonaceous materials which form and deposit during the treatment the catalysts are reactivated by superheated steam and/or air or oxygen at temperatures varying from 500° to 1000° F. dependent on the concentrations of oxygen. The steam concentration may be increased toward the end of the burning off period and then both steam and temperatures may be decreased towards the very end.

The specific examples shown in the tables following are typical of the proportions of materials used and the properties of the resulting products although they should not be construed as limiting either as to specific materials or proportions within the broad scope and spirit of my invention.

EXAMPLES

Table 1.—Aluminum compound additives

|  | $Al_2O_3$ | | (a) | |
|---|---|---|---|---|
|  | (1) | (2) | (3) | (4) |
| Pts. by wt. of 85% $H_3PO_4$ | 72.0 |  | 72.0 |  | 72.0 |  | 72.0 |  |
| Pts. by wt. of $P_2O_5$ | 40.0 |  | 39.0 |  | 40.0 |  | 39.0 |  |
| Equiv. of 100% $H_3PO_4$ | 116.5 |  | 115.0 |  | 116.5 |  | 115.0 |  |
| Percent of 100% $H_3PO_4$ |  | 79.0 |  | 80.0 |  | 79.0 |  | 80.0 |
| Pts. by wt. of kieselguhr | 29.0 |  | 27.5 |  | 29.0 |  | 27.5 |  |
| Percent of kieselguhr |  | 19.6 |  | 19.1 |  | 19.6 |  | 19.1 |
| Pts. by wt. of additive | 2.3 |  | 1.5 |  | 2.3 |  | 1.5 |  |
| Percent of additive |  | 1.6 |  | 1.1 |  | 1.6 |  | 1.1 |
|  |  | 100.2 |  | 100.2 |  | 100.2 |  | 100.2 |
| Relative hardness | 3+ | | 3− | | 2.5 | | 2.5 | |
| Relative compression strength | 260 | | 150 | | 220 | | 200 | |

Table 2.—Magnesium compound additives

|  | MgO | | | | $MgCO_3$ b | | $Mg_3(PO_4)_2$ | |
|---|---|---|---|---|---|---|---|---|
|  | (1) a | | (2) | | (3) | | (4) | |
| Pts. by wt. of 85% $H_3PO_4$ | 71.5 |  | 72.0 |  | 71.5 |  | 71.5 |  |
| Pts. by wt. of $P_2O_5$ | 40.0 |  | 40.0 |  | 40.0 |  | 40.0 |  |
| Equiv. of 100% $H_3PO_4$ | 116.0 |  | 116.5 |  | 116.0 |  | 116.0 |  |
| Percent of 100% $H_3PO_4$ |  | 79.5 |  | 79.0 |  | 79.0 |  | 78.5 |
| Pts. by wt. of kieselguhr | 28.0 |  | 29.0 |  | 28.0 |  | 29.0 |  |
| Percent by wt. of kieselguhr |  | 19.1 |  | 19.6 |  | 19.2 |  | 19.8 |
| Pts. by wt. of additive | 2.5 |  | 2.3 |  | 2.3 |  | 2.3 |  |
| Percent of additive |  | 1.7 |  | 1.6 |  | 1.6 |  | 1.5 |
|  |  | 100.3 |  | 100.2 |  | 99.8 |  | 99.8 |
| Relative hardness | 3.0 | | 2.5 | | 2.5 | | 2.5 | |
| Relative compression strength | 250 | | 175 | | 140 | | 200 | | a MgO mixed direct with $H_3PO_4$ and dissolved $P_2O_5$.
b $MgCO_3$ mixed as in (a).

Table 3.—Calcium compound additives

|  | CaO | | | | $CaSO_3$ | | $CaSO_4$ | | $Ca_3(PO_4)_2$ | |
|---|---|---|---|---|---|---|---|---|---|---|
|  | (1) a | | (2) b | | (3) | | (4) | | (5) | |
| Pts. by wt. of $H_3PO_4$ | 72.0 |  | 72.0 |  | 72.0 |  | 72.0 |  | 72.0 |  |
| Pts. by wt. of $P_2O_5$ | 39.0 |  | 40.0 |  | 40.0 |  | 40.0 |  | 40.0 |  |
| Equiv. of 100% $H_3PO$ | 116.0 |  | 116.5 |  | 116.5 |  | 116.5 |  | 116.5 |  |
| Percent of 100% $H_3PO$ |  | 79.0 |  | 79.3 |  | 78.5 |  | 79.0 |  | 79.0 |
| Pts. by wt. of kieselguhr | 29.0 |  | 29.0 |  | 30.0 |  | 29.0 |  | 29.5 |  |
| Percent by wt. of kieselguhr |  | 19.7 |  | 19.7 |  | 20.2 |  | 19.6 |  | 20.0 |
| Pts. by wt. of additive | 2.0 |  | 1.4 |  | 1.6 |  | 2.3 |  | 1.6 |  |
| Percent of additive |  | 1.4 |  | 1.0 |  | 1.1 |  | 1.6 |  | 1.1 |
|  |  | 100.1 |  | 100.0 |  | 99.8 |  | 100.2 |  | 100.1 |
| Relative hardness | 2.5 | | 2.0 | | 2.5 | | 2.0 | | 2.0 | |
| Relative compression strength | 150 | | 140 | | 150 | | 140 | | 150 | | a CaO (purified) mixed direct with $H_3PO_4$ and dissolved $P_2O_5$.
b Commercial CaO worked in final mixture.

The tables above, 1 to 3, inclusive, show the formulation and composition and in addition illustrate the characteristics of my improved polymerization catalysts particularly with respect to structural or compression strength and hardness (resistance to abrasion) both of which are indexes of the wearing qualities and hardness. The structural or compressive strength tests represent the total thrust in pounds using the proving ring method on prepared representative specimens of fairly uniform size and shape (approximately ⅝" to ¾" cube) and represent the average of several comparative determinations on each type. The hardness data were made employing the Mohs' mineral scale which is conventional in determining the relative hardness of minerals. The hardness and compression strength of a standard containing 80% phosphoric acid and 20% kieselguhr (with no additive present) made under similar conditions i.e. heating the mixture up to 600° F. for 4 hours showed a hardness of about 1 on the same scale and compression strength of 10 to 15. Heating the standard to between 750° F. and 800° F. for an additional hour increased these values (of a standard) for hardness to about 1+ and the compression strength to about 35. However, some increases in these values may be similarly obtained for my catalyst but the cost likewise increases and except in special cases as has been stated it has not been found necessary or desirable. Moreover, the improvement in the standard shown above is entirely insufficient when compared to the values obtainable according to my invention.

With regard to polymerization activities, the conventional method for the polymerization of propylene under controlled and comparable experimental conditions may be employed. The catalysts shown in the tables will vary within several percent only from the standard showing a minimum of about 97% of the standard (where about 2.5% of the additive is used) and 99% when the additive is about 1.5% or less and the phosphoric acid contents are between 79% and 80%. This is consistent with reported data on a standard polymerization catalyst containing about 80% phosphoric acid and 20% kieselguhr. The generally assigned activity of the latter is about 80. Additional phosphoric acid in the catalyst could of course be incorporated and exceed the standard, although the present differences are negligible from a practical viewpoint considering the greatly increased value as a result of greatly prolonged life of a catalyst.

With regard to the preparation of a catalyst according to my invention which has activities (and phosphoric acid contents) in excess of 80% and as a further example such a catalyst may be prepared by simultaneously increasing the content of 85% $H_3PO_4$ to 76.5 parts of weight and 42 parts of $P_2O_5$. The latter readily dissolves in the 85% $H_3PO_4$ on warming. The heavy liquid resulting permits a reduced workable proportion of kieselguhr which on adding the additive (e.g. $Al_2O_3$ or MgO) direct to the acid could result in a final mixture which may be extruded and may contain up to or in excess of 82% $H_3PO_4$, with a polymerizing activity in excess of the standard and a many fold increase in hardness, compression strength and life of the catalyst.

On the other hand, at the other end of the scale, I may when desired increase the kieselguhr content of the catalyst or the additive or both and reduce the phosphoric acid content e.g. from 60 to 75% (or more) to make a catalyst of lower activity but otherwise of very high compression strength and hardness. The lower range here represents an unusual type which probably might be used in very special cases, but the upper range e.g. from 70% to 78% $H_3PO_4$ might find considerable use e.g. alkylation although the ranges between 78% and 82% $H_3PO_4$ (with corrections for additive) would be most widely employed for normal operations of polymerizing olefin gases to produce motor fuels.

With further reference to the data in the above tables the use of oxides is preferred on the basis of ease of handling as well as being less costly. Increase in the percentage of aluminum oxide beyond 10% based on the mineral mix and 2% based on the composition of the catalyst as herein presented increased the hardness and compression strength further but except for special cases this probably would not compensate for even the small loss in activity (due to neutralization of correspondingly small amounts of phosphoric acid).

The hydroxides could be substituted for the oxides with satisfactory results as tests made have demonstrated adjusting the amounts with reference to the corresponding oxides to compensate for the diluting effect of the combined water in the hydroxide. In this connection calcium hydroxide (e.g. slaked lime) showed good results on a comparable basis with calcium oxide. Also selected bauxites (the naturally occurring hydrated oxide of aluminum) also showed good results in comparison with $Al_2O_3$, and of course some account must be taken of the impurities present in varying amounts in bauxite.

I have found in connection with the procedure that mixing the additive direct with the phosphoric acid (to which $P_2O_5$ has been added) and admixing the kieselguhr later gives somewhat improved results especially for magnesium and calcium oxides which may contain carbonates, and of course with the carbonates themselves. Aside from the highly objectionable chlorides there are thus several advantages in producing the phosphates prior to mixing as well as in general producing the phosphates "in situ" from other additive compounds rather than using the phosphates direct. In some cases, however, especially where no gases are produced it may be convenient from an operating viewpoint to mix the additive direct with the kieselguhr and then with the phosphoric acid, or alternatively with the mixture of phosphoric acid and kieselguhr as a final operation.

It will be understood that there are variations in the concentration of phosphoric acid, e.g. 75% to 85% and higher as well as the percentages and amounts of phosphorous pentoxide which may be incorporated therein whereby one may obtain a satisfactory mixture with kieselguhr, infusorial earth, etc. of the proper consistency to be extruded and dried or baked without being deformed. However, these initial concentrations of phosphoric acid and amounts of $P_2O_5$ and of the mineral components are within narrow enough limits for each concentration of phosphoric acid in the final catalyst product to be readily ascertained by trial and experience. Also it must be understood that there are many possible variations in composition of raw materials and of the final product and of conditions generally; and therefore I do not desire to be limited except with the broad spirit and scope of my invention.

I claim:

1. A polymerization catalyst comprising a dried mixture of a phosphoric acid and an inorganic support, said support consisting of a natural porous silica material selected from the group consisting of kieselguhr, infusorial earth and diatomaceous earth and an additive consisting of phosphate of aluminum incorporated in said mixture the said phosphoric acid comprising about 60% to 85% of the said mixture, said support containing not less than about 70% of the said porous silica material and less than about 30% and more than 1% of the said additive, the said porous silica material together with said additive being present in quantity of not more than about 40% of the mixture.

2. A polymerization catalyst comprising a dried mixture of a phosphoric acid and an inorganic support, said support consisting of a natural porous silica material selected from the group consisting of kieselguhr, infusorial earth and diatomaceous earth and an additive consisting of oxide of aluminum incorporated in said mixture the said phosphoric acid comprising about 60% to 85% of the said mixture, said support containing not less than about 70% of the said porous silica material and less than about 30% and more than 1% of the said additive, the said porous silica material together with said additive being present in quantity of not more than about 40% of the mixture.

3. A polymerization catalyst comprising a dried mixture of a phosphoric acid and an inorganic support, said support consisting of a natural porous silica material selected from the group consisting of kieselguhr, infusorial earth and diatomaceous earth and an additive consisting of phosphate of magnesium incorporated in said mixture the said phosphoric acid comprising about 60% to 85% of the said mixture, said support containing not less than about 70% of the said porous silica material and less than about 30% and more than 1% of the said additive, the said porous silica material together with said additive being present in quantity of not more than about 40% of the mixture.

4. A polymerization catalyst comprising a dried mixture of a phosphoric acid and an inorganic support, said support consisting of a natural porous silica material selected from the group consisting of kieselguhr, infusorial earth and diatomaceous earth and an additive consisting of oxide of magnesium incorporated in said mixture the said phosphoric acid comprising about 60% to 85% of the said mixture, said support containing not less than about 70% of the said porous silica material and less than about 30% and more than 1% of the said additive, the said porous silica material together with said additive being present in quantity of not more than about 40% of the mixture.

5. A polymerization catalyst comprising a dried mixture of a phosphoric acid and an inorganic support, said support consisting of a natural porous silica material selected from the group consisting of kieselguhr, infusorial earth and diatomaceous earth and an additive consisting of phosphate of calcium incorporated in said mixture the said phosphoric acid comprising about 60% to 85% of the said mixture, said support containing not less than about 70% of the said porous silica material and less than about 30% and more than 1% of the said additive, the said porous silica material together with said additive being present in quantity of not more than about 40% of the mixture.

6. A polymerization catalyst comprising a dried mixture of a phosphoric acid and an inorganic support, said support consisting of a natural porous silica material selected from the group consisting of kieselguhr, infusorial earth and diatomaceous earth and an additive consisting of oxide of calcium incorporated in said mixture the said phosphoric acid comprising about 60% to 85% of the said mixture, said support containing not less than about 70% of the said porous silica material and less than about 30% and more than 1% of the said additive, the said porous silica material together with said additive being present in quantity of not more than about 40% of the mixture.

7. A polymerization catalyst comprising a dried mixture of a phosphoric acid and an inorganic support, said support consisting of a natural porous silica material selected from the group consisting of kieselguhr, infusorial earth and diatomaceous earth and an additive consisting of silicate of calcium incorporated in said mixture the said phosphoric acid comprising about 60% to 85% of the said support containing not less than about 70% of the said porous silica material and less than about 30% and more than 1% of the said additive, the said porous silica material together with said additive being present in quantity of not more than about 40% of the mixture.

8. A polymerization catalyst comprising a dried mixture of a phosphoric acid and an inorganic support, said support consisting of a natural porous silica material selected from the group consisting of kieselguhr, infusorial earth and diatomaceous earth and an additive consisting of sulphate of calcium incorporated in said mixture the said phosphoric acid comprising about 60% to 85% of the said mixture, said support containing not less than about 70% of the said porous silica material and less than about 30% and more than 1% of the said additive, the said porous silica material together with said additive being present in quantity of not more than about 40% of the mixture.

References Cited by the Examiner

UNITED STATES PATENTS

| | | | |
|---|---|---|---|
| 1,993,512 | 3/35 | Ipatieff | 252—435 |
| 2,586,852 | 2/52 | Morrell | 252—435 |
| 2,656,323 | 10/53 | Bielawski et al. | 252—435 |
| 2,692,242 | 10/54 | Bielawaki et al. | 252—435 |
| 2,713,560 | 7/55 | Morrell | 252—435 |
| 3,044,964 | 7/62 | Morrell | 252—435 |
| 3,050,472 | 8/62 | Morrell | 252—435 |
| 3,050,473 | 8/62 | Morrell | 252—435 |

MAURICE A. BRINDISI, *Primary Examiner.*

BENJAMIN HENKIN, *Examiner.*